(12) United States Patent
Asaad et al.

(10) Patent No.: US 10,127,275 B2
(45) Date of Patent: Nov. 13, 2018

(54) MAPPING QUERY OPERATIONS IN DATABASE SYSTEMS TO HARDWARE BASED QUERY ACCELERATORS

(71) Applicant: International Business Machines Corporation, Armonk, NY (US)

(72) Inventors: Sameh Asaad, Briarcliff Manor, NY (US); Parijat Dube, Yorktown Heights, NY (US); Balakrishna R. Iyer, San Jose, CA (US); Hong Min, Poughkeepsie, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 977 days.

(21) Appl. No.: 14/328,933

(22) Filed: Jul. 11, 2014

(65) Prior Publication Data

US 2016/0012107 A1    Jan. 14, 2016

(51) Int. Cl.
   *G06F 17/30* (2006.01)
(52) U.S. Cl.
   CPC .. *G06F 17/30442* (2013.01); *G06F 17/30519* (2013.01)
(58) Field of Classification Search
   None
   See application file for complete search history.

(56) References Cited

U.S. PATENT DOCUMENTS

| 6,748,386 | B1 | 6/2004 | Li |
| 2008/0189252 | A1 | 8/2008 | Branscome et al. |
| 2008/0250011 | A1 | 10/2008 | Haubold et al. |
| 2012/0047126 | A1 | 2/2012 | Branscome et al. |
| 2012/0124070 | A1 | 5/2012 | Mishra et al. |

(Continued)

FOREIGN PATENT DOCUMENTS

| EP | 2182448 A1 | 5/2010 |
| WO | 2007061430 A1 | 5/2007 |
| WO | 2007143198 A2 | 12/2007 |

OTHER PUBLICATIONS

U.S. Appl. No. 14/977,832, filed Dec. 22, 2015.
(Continued)

*Primary Examiner* — James Trujillo
*Assistant Examiner* — Cheryl M Shechtman
(74) *Attorney, Agent, or Firm* — Cantor Colburn LLP

(57) ABSTRACT

Methods and arrangements for mapping a query operation to an accelerator are provided. The method includes receiving, by a processor, a query operation and determining the design logic of the query operation, receiving a configuration of one or more available accelerators and a design logic of each of the one or more available accelerators, and determining if the query operation can be offloaded to one or more of the one or more available accelerators. Based on a determination that the query operation can be offloaded to one or more of the one or more available accelerators, the method also includes creating software structures to interface with a selected accelerator and executing the query operation on the selected accelerator. Based on a determination that the query operation cannot be offloaded to one or more of the one or more available accelerators, the method further includes executing the query operation in software.

12 Claims, 7 Drawing Sheets

(56) References Cited

U.S. PATENT DOCUMENTS

2012/0278339 A1 11/2012 Wang
2013/0054942 A1 2/2013 Serrano

OTHER PUBLICATIONS

U.S. Appl. No. 14/977,835, filed Dec. 22, 2015.
U.S. Appl. No. 14/741,490, filed Jun. 17, 2015.
List of IBM Patents or Patent Application Treated as Related; (Appendix P), dated filed Mar. 25, 2016, 2 pages.
U.S. Appl. No. 12/246,751, filed Oct. 7, 2008.
U.S. Appl. No. 14/328,933, filed Jul. 11, 2014.
U.S. Appl. No. 14/583,999, filed Dec. 29, 2014.
List of IBM Patents or Patent Applications Treated as Related, U.S. Appl. No. 14/328,933, filed Jul. 11, 2014, pp. 1-2.
List of IBM Patents or Patent Applications Treated as Related—Date Filed: Jul. 11, 2014; 2 pages.
Gosink et al., "Query-Driven Visualization of Time-Varying Adaptive Mesh Refinement Data", IEEE Transactions on Visualization and Computer Graphics, vol. 14, No. 6, Nov./Dec. 2008; pp. 1715-1722.
U.S. Appl. No. 13/961,089, filed Aug. 7, 2013.
U.S. Appl. No. 13/961,092, filed Sep. 7, 2013.
U.S. Appl. No. 13/961,094, filed Aug. 7, 2013.
U.S. Appl. No. 13/961,095, filed Aug. 7, 2014.
U.S. Appl. No. 14/018,646, filed Sep. 5, 2013.
U.S. Appl. No. 14/018,647, filed Sep. 5, 2013.
U.S. Appl. No. 14/018,650, filed Sep. 5, 2013.
U.S. Appl. No. 14/018,651, filed Sep. 5, 2013.
Sukhwani et al., "Database Analytics Acceleration using FPGAs", PACT' 12, Sep. 19-23, 2012; Minneapolis, Minnesota, USA; Copyright 2012 ACM, 10 pgs.
Xu et al., "Query decomposition based on ontology mapping in data integration system", Third International Conference on Natural Computation (ICNC 2007), 2007 IEEE; pp. 1-5.

$(f1=v1\ \&\ ((f3<v2\ \&\ f6=v3)\ \&\ (f2>v4\ |\ f8<=v6)))$

US 10,127,275 B2

MAPPING QUERY OPERATIONS IN DATABASE SYSTEMS TO HARDWARE BASED QUERY ACCELERATORS

BACKGROUND

The present invention relates to accelerating query operations with hardware accelerators, and more specifically, to mapping query operations in database systems to hardware based query accelerators.

Currently, hardware accelerators, such as Field Programmable Gate Arrays (FPGAs), are used to accelerate query operations in database systems. These query processing operations include, but are not limited to, sort operations, decompression operations, projection operations, predicate evaluation operations, and join operations. In general, offloading an operation to an FPGA and using the FPGA to accelerate DBMS (database management system) operations offers performance and cost benefits.

Since query processing operations vary with respect to the type of operations and the workload used by the operations, the performance and cost benefits of using FPGAs for the query processing operations are also variable. In addition, variances in the type and configuration of the FPGA which the operation is offloaded to can impact performance and cost benefits of using FPGAs for the query processing operations.

BRIEF SUMMARY

Exemplary embodiments include a method for mapping a query operation to an accelerator. The method includes receiving, by a processor, a query operation and determining the design logic of the query operation, receiving a configuration of one or more available accelerators and a design logic of each of the one or more available accelerators, and determining if the query operation can be offloaded to one or more of the one or more available accelerators. Based on a determination that the query operation can be offloaded to one or more of the one or more available accelerators, the method also includes creating software structures to interface with a selected accelerator and executing the query operation on the selected accelerator. Based on a determination that the query operation cannot be offloaded to one or more of the one or more available accelerators, the method further includes executing the query operation in software.

Exemplary embodiments include a method for mapping a query operation to a hardware implementation on an accelerator. The method includes receiving, by a processor, a database query from an application, wherein the database query comprises one or more query operations, determining a configuration of one or more accelerators and a design logic for each of the of one or more accelerators, and identifying a candidate query operation from the one or more query operations which can be offloaded to one of the one or more accelerators. The method also includes identifying one or more database structures holding information corresponding to the candidate query operation, determining attributes of the one of the one or more accelerators selected to implement the candidate query operation and creating an intermediate data structure representing the candidate query operation based on the attributes. The method further includes transforming the intermediate data structure into data structures that will be provided to the one of the one or more accelerators.

Exemplary embodiments include a method for evaluating performance gains from offloading query processing operations to one or more accelerators. The method includes receiving, by a processor, a workload of queries, receiving design logic of query operations of the workload of queries and a configuration of elements in accelerators, and determining a percentage the query operations in the workload of queries that can be offloaded to the accelerators. The method also includes estimating the performance gains achievable with the accelerators for the given workload of queries.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments generally include methods and systems for facilitating acceleration of query processing operations on an accelerator, such as an FPGA. More specifically, exemplary embodiments include methods and systems for mapping query processing operations to a hardware implementation of the operation on an accelerator based on one or more of the type of the operation, the size and/or data needed for the operation, and the characteristics of the available accelerators.

In exemplary embodiments, a DMBS query engine and an FPGA-based acceleration engine are used for offloading database operations to accelerators. As described in more detail in related U.S. patent application Ser. No. 13/599,600, filed on Aug. 30, 2012 and entitled FACILITATING FIELD PROGRAMMABLE GATE ARRAY ACCELERATIONS OF DATABASE FUNCTIONS, which is incorporated by reference herein in its entirety, such a DMBS query engine and FPGA-based acceleration engine are known whereby a DBMS can seamlessly harness FPGA computing power without requiring any changes in the application or the existing data layout.

Figure 1:
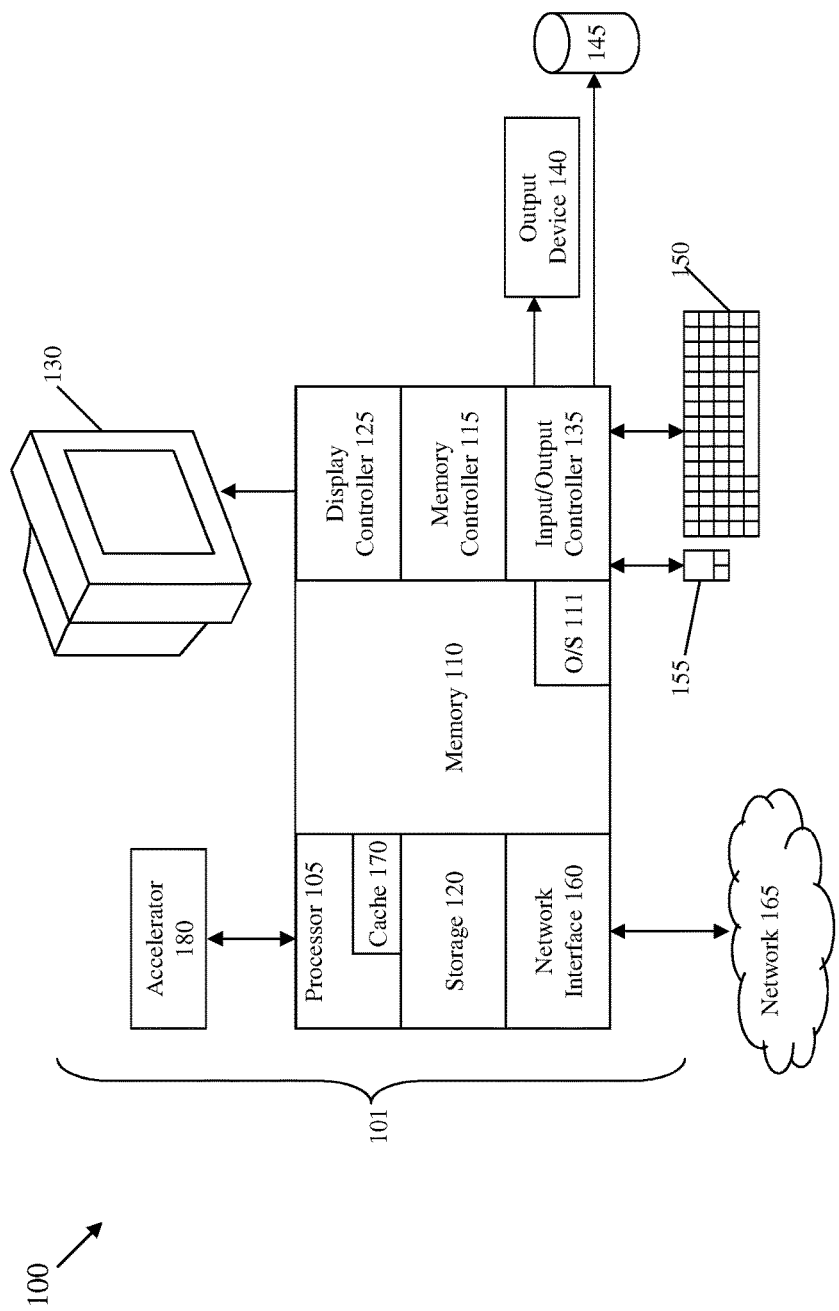
FIG. 1 depicts a block diagram of a computer system for practicing the teachings herein according to an embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), phase change memory (PCM), flash based memory, tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA) or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

Figure 2:
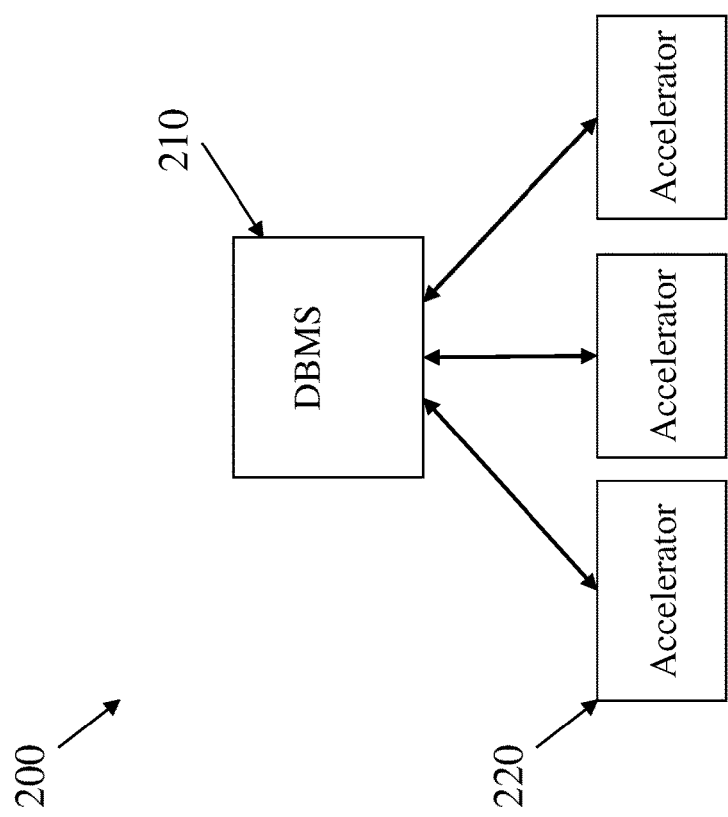
FIG. 2 depicts a block diagram of a system for accelerating multiple query processing operations in accordance with an exemplary embodiment.

Referring now to FIG. 2, a block diagram of a system 200 for accelerating query processing operations in accordance with an exemplary embodiment is shown. As illustrated the system 200 includes a DBMS (database management system) 210 and a plurality of accelerators 220. The DBMS 210 is configured to receive a query, process the query and to return the results of the query. In exemplary embodiments, the DBMS 210 is configured to communicate with the plurality of accelerators 220 and is configured to selectively offload one or more query operations to one or more of the plurality of accelerators 220. In exemplary embodiments, the DBMS 210 is configured to determine which operations to offload and to which of the plurality of accelerators 220 based on one or more of the type of the operation, the size and/or data needed for the DBMS operation, and the characteristics of each of the plurality of accelerators 220. In addition, the DBMS 210 is configured to determine if processing an operation in software, rather than an accelerator, is more efficient.

Figure 3:
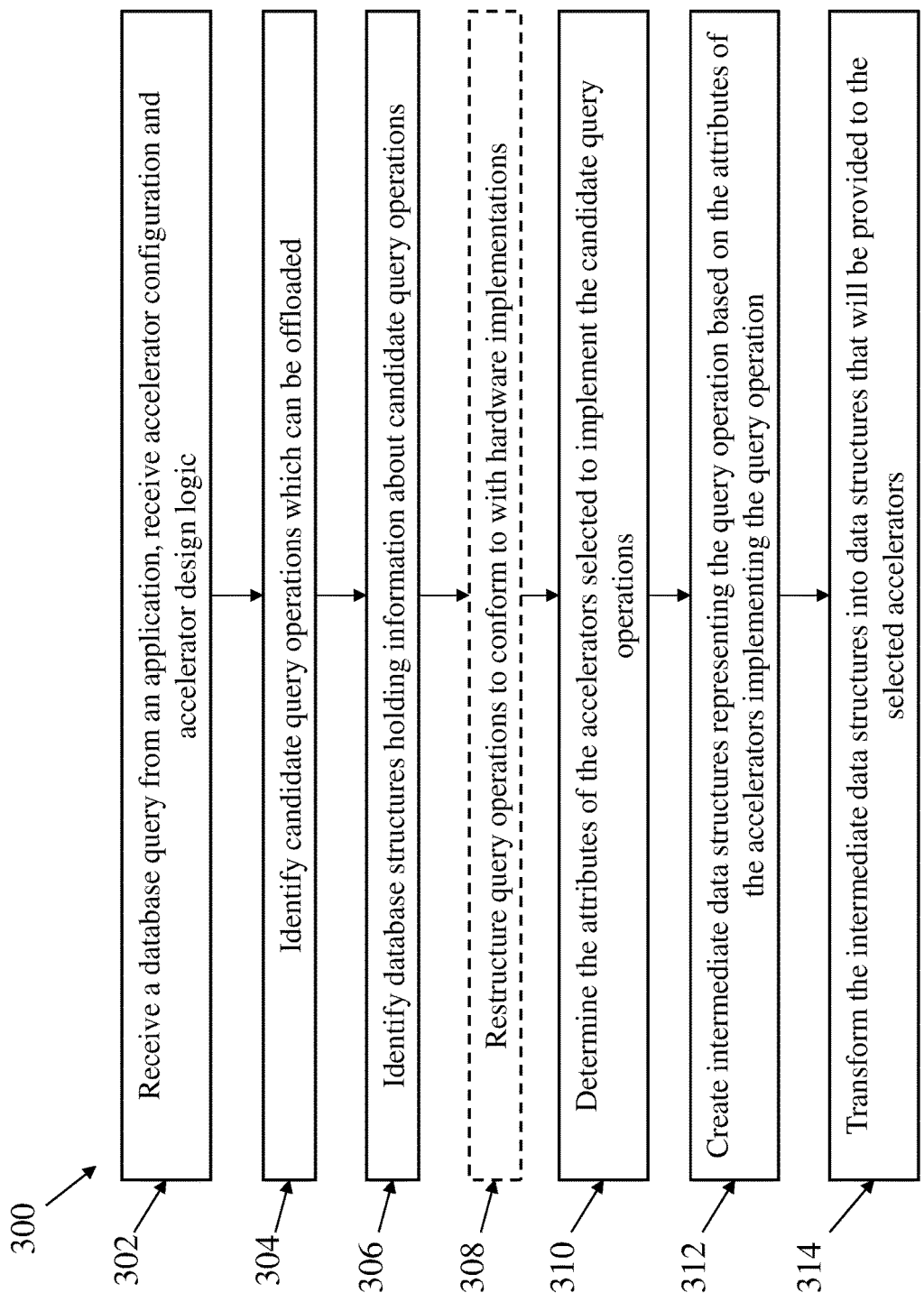
FIG. 3 depicts a flowchart diagram of a method for mapping query processing operations to a hardware implementation on an accelerator in accordance with an exemplary embodiment.

Referring now to FIG. 3, a flowchart diagram of a method 300 for mapping query processing operations to a hardware implementation on an accelerator in accordance with an exemplary embodiment is shown. As illustrated at block 302, the method 300 includes receiving a database query from an application and receiving accelerator configuration and accelerator design logic. Next, as shown at block 304, the method 300 includes identifying candidate query operations which can be offloaded. In exemplary embodiments, candidate query operations are identified based on one or more of the database query, the accelerator configuration and the accelerator design logic. For example, if a database query requires a sort operation, a decompression operation, and a predicate evaluation operation and the accelerator configuration and the accelerator design logic indicate that the available accelerators are capable of performing sort operations and decompression operations. As a result, the sort operation and decompression operation would be identified as candidate query operations which can be offloaded.

Next, as shown at block 306, the method 300 includes identifying database structures holding information about candidate query operations. As shown at block 308, the method 300 may include restructuring query operations to conform to hardware implementations. In exemplary embodiments, if the database structures holding information about candidate query operations are too large to be processed by the available accelerators the query operations may be restructured to be processed by the accelerators, as discussed in more detail below with reference to FIG. 6A-6D.

Continuing with reference to FIG. 3, as shown at block 310, the method 300 includes determining the attributes of the accelerators selected to implement the candidate query operations. Next, as shown at block 312, the method 300 includes creating intermediate data structures representing the query operation based on the attributes of the accelerators implementing the query operation. As shown at block 314, the method 300 includes transforming the intermediate data structures into data structures that will be provided to the selected accelerators.

Figure 4:
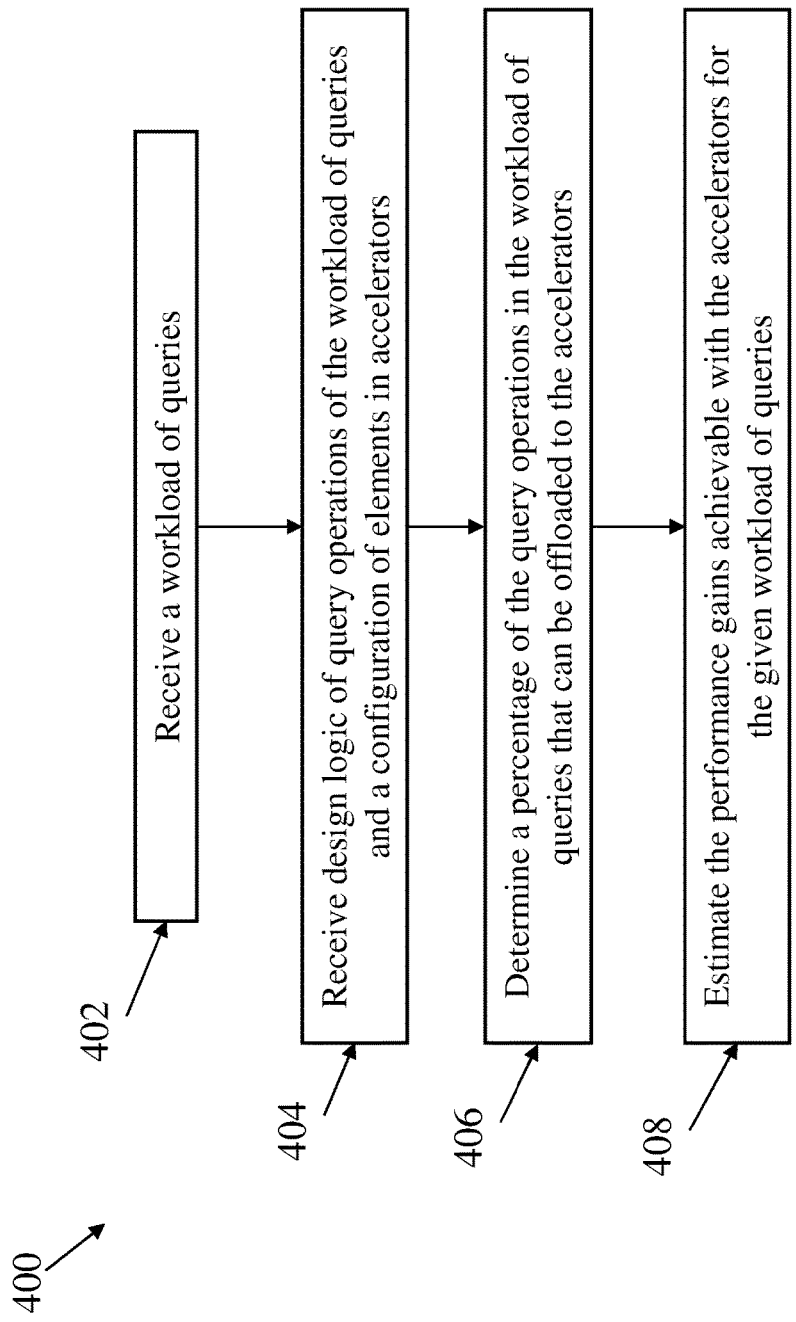
FIG. 4 depicts a flowchart diagram of a method for evaluating performance gains from offloading query processing operations to one or more accelerators in accordance with an exemplary embodiment.

Referring now to FIG. 4, a flowchart diagram of a method 400 for evaluating performance gains from offloading query processing operations to one or more accelerators in accordance with an exemplary embodiment is shown. As illustrated at block 402, the method 400 includes receiving a workload of queries. Next, as shown at block 404, the method 400 includes receiving hardware design logic of query operations of the workload of queries and a configuration of elements in accelerators. The method 400 also includes determining a percentage of the query operations in the workload of queries that can be offloaded to the accelerators, as shown in the block 406. Next, as shown at block 408, the method 400 includes estimating the performance gains achievable with the accelerators for the given workload of queries. In exemplary embodiments, the method 400 may be iteratively performed and the number and configuration of accelerators may be changed between iterations. As a result, a cost-benefit analysis can be performed to determine a desired number and configuration of accelerators for a specified workload of queries.

Figure 5:
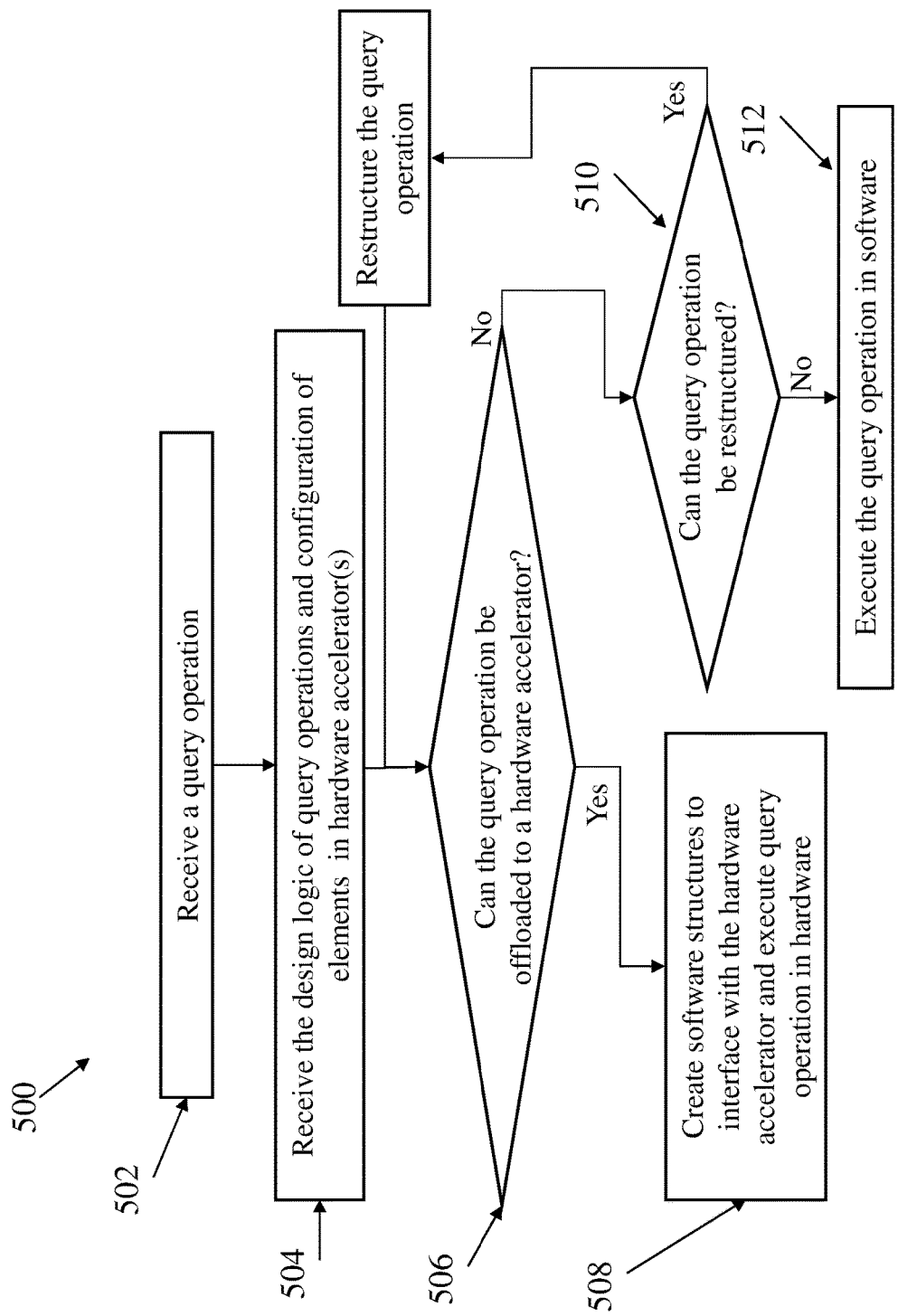
FIG. 5 depicts a flowchart diagram of a method for mapping query processing operations to a hardware implementation on an accelerator in accordance with an exemplary embodiment.

Referring now to FIG. 5, a flowchart diagram of a method 500 for mapping query processing operations to a hardware implementation on an accelerator in accordance with an exemplary embodiment is shown. As illustrated at block 502, the method 500 includes receiving a query operation and determining the design logic of the query operation. Next, as shown at block 504, the method 500 includes receiving the configuration and hardware design logic of one or more available accelerators. Next, as shown at decision block 506, the method 500 includes determining if the query operation can be offloaded. In exemplary embodiments, the determination whether the query operation can be offloaded is based on one or more of the design logic of the query operation, the accelerator configuration and the accelerator design logic. If the query operation can be offloaded, the method 500 proceeds to block 508 and creates software structures to interface with the accelerator and executes the query operation in accelerator. If the query operation cannot be offloaded, the method 500 proceeds to decision block 510 and determine if the query operation can be restructured. If the query operation can be restructured, the method 500 returns to decision block 506. If query operation cannot be restructured, the method 500 proceeds to block 512 and executes the query operation in software.

In exemplary embodiments, restructuring of a query operation may include transforming the type of query operation. For example, a join predicate query operation may be transformed into in-list. In exemplary embodiments, restructuring of a query operation may include partitioning a query operation into multiple query operation. For example, a query operation may be decomposed into sub-operations which can be mapped to one or more accelerators. In exemplary embodiments, different rules or algorithms may be used for determining the order of evaluating these sub-queries in the hardware and combining the results of sub-operations of the same query operation can be developed. In exemplary embodiments, the query operation may be partitioned in horizontal or vertical manner. When partitioning a query operation, control blocks corresponding to the query operation that include a query operation ID in the sub-operations of the same query are used to facilitate their orchestration on (possibly multiple) hardware and combination of their results.

Figures 6A, 6B:
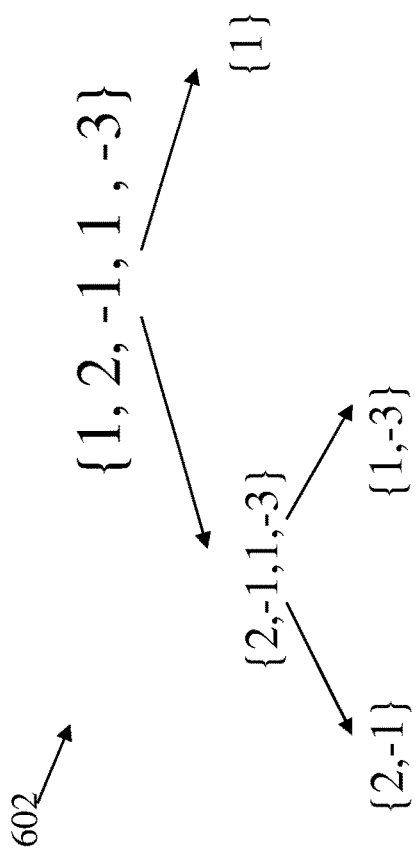
FIGS. 6A, 6B, 6C and 6D respectively depict a DMBS query, an intermediate data structure, an accelerator query representation, and a specific hardware implementation of the accelerator query representation in accordance with an exemplary embodiment.

In exemplary embodiments, in order to offload a query operation, the database structures need to be transformed to construct a predicate network, or tree that can be evaluated by an accelerator. FIGS. 6A through 6B illustrate an example of transformation from a DBMS query, specifically a selection clause in a database query show in FIG. 6A, into an intermediate data structure shown in FIG. 6B, into an accelerator query representation shown in FIG. 6C, and into a specific hardware implementation shown in FIG. 6D. As shown in FIG. 6A a selection clause in a database query 600, (f1=v1 & ((f3<v2 & f6=v3) & (f2>v4|f8<=v6))), is to be offloaded to an accelerator. First, the selection clause 600 is transformed into an intermediate data structure 602.

In exemplary embodiments, the root of the intermediate data structure 602 is an array which includes an element for each operation and the element is represented by subtracting the number of open parentheses on the left of the operation from the number of closed parentheses on the right of the operation. In the example above, the array is {1, 2, −1, 1, −3}. Next, a pivot point for the intermediate data structure 602 is determined. The pivot point sits between two consecutive elements in the array such as the absolute value of the sum all elements to the left of the pivot point is the lowest and is equal to the absolute value of the sum of all element to the right of the pivot point. In the illustrated example, the pivot point is between the first and second element because the abs(sum_left)=1 and abs(sum_right)= abs(2−1+1−3)=1. The array is then divided into two subgroups by the partition point. If there are more than one pivot points then a partition which is more balanced is selected. In the illustrated example, a first group is {1} and the second group is {2, −1, 1, −3}. The above steps are recursively perform on each group until the group only has 1 or 2 elements. In the illustrated example, the right group is again split into groups of {2, −1} and is {1, −3}. Based on recursive level an element is ended, its depth in the tree can be determined.

Figure 6C:
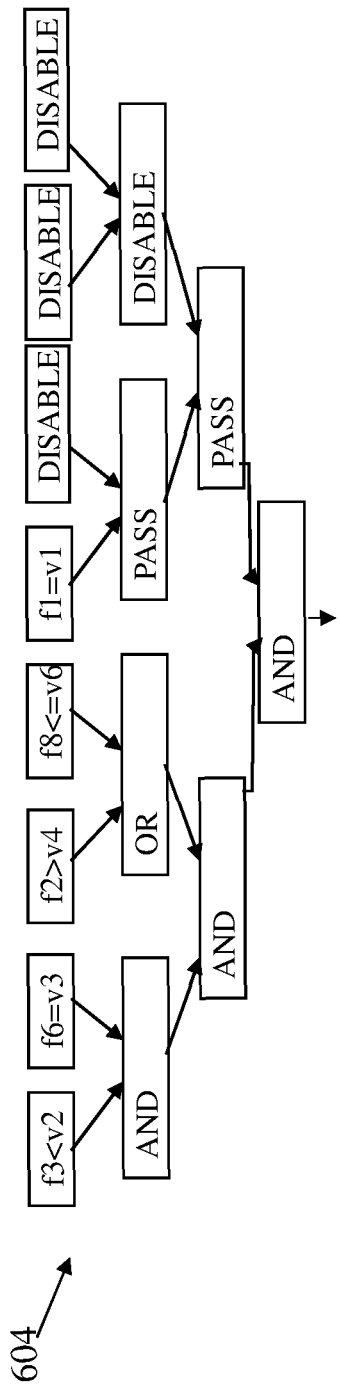

Once the intermediate data structure 602 has been created, the intermediate data structure 602 can be mapped to an accelerator query representation 604, as shown in FIG. 6C. In the illustrated example, the accelerator query representation 604 requires an eight processing entity binary network to be executed. If the available accelerators include an eight processing entity binary network, the accelerator query representation 604 can be executed without being modified or restructured as shown in FIG. 6C. However, in a case where the accelerators do not have sufficient hardware resources the accelerator query representation can be restructured.

When the accelerator query representation cannot be mapped to the FPGA due to hardware limitations (e.g., number of processing entities) the query operation can be restructured into sub-operations which can be mapped to hardware and the evaluation of query-operation on hardware is done by combining the partial results from evaluation of each sub-operation on the hardware. Different rules/algorithms can be developed to determine the right order of evaluating these sub-operations in the hardware and for combining their partial results. Control blocks corresponding to the query operations carry the query operation ID in the sub-operations of the query to facilitate their orchestration on (possibly multiple) hardware accelerators and for right combination of their results.

Figure 6D:
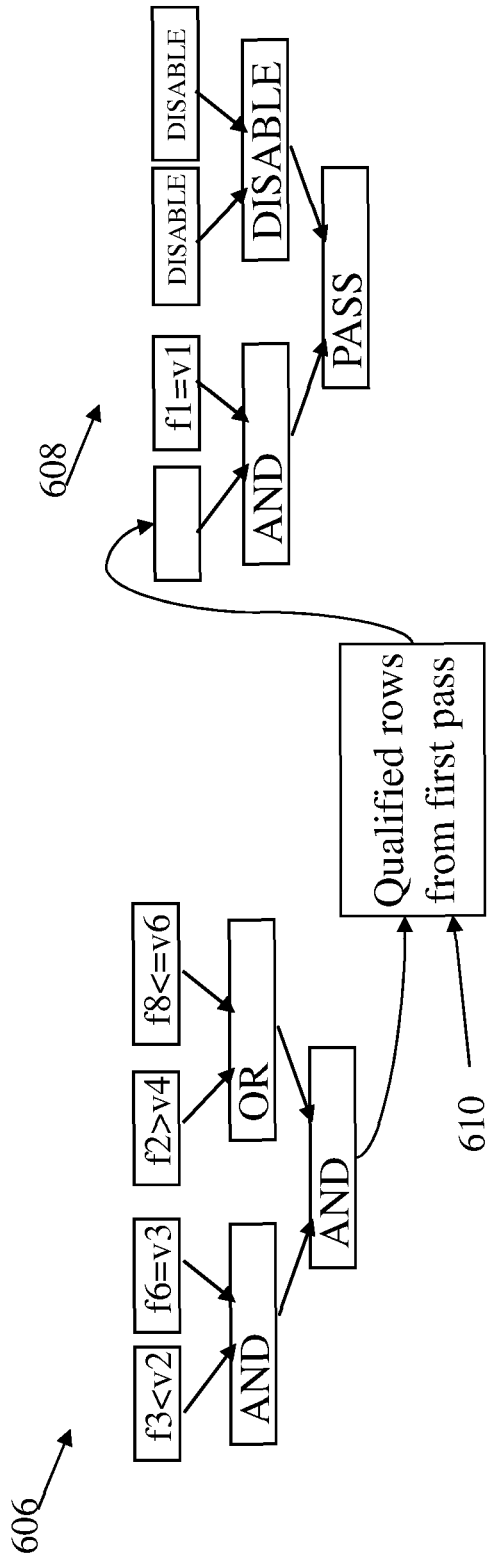

One way to restructure a query operation is to decompose it into sub-operations is through horizontal and/or vertical partitioning of the accelerator query representation. In the illustrated example, the accelerator query representation 604 can map, with restructuring, to an accelerator with an eight processing entity binary network. Consider a scenario when the accelerator only has a four processing entity binary network. To execute the accelerator query representation 604 on this four processing entity binary network it must be restructured. FIG. 6D illustrates an example of the accelerator query representation 604 being restructured (through vertical partitioning) into a first pass 606 and a second pass 608 such that it can be executed on a four processing entity binary network with the results from the first pass being stored in 610. The intermediate results from the first pass (qualified rows) can be stored either in the local memory of the accelerator or in the host memory for further processing. For this example, since the reduction operation linking the two partitions is a logical conjunction (AND), the database rows qualified by the first pass 606 can simply be fed into the second pass. Depending on the size of the data, the qualified rows from the first pass can be held in local memory of the accelerator or returned to the host and streamed in again. For logical disjunction (OR), however, simply feeding the output of the first pass into the second pass may result in useful rows being filtered away while re-scanning the original dataset may result in duplicates. There is more than one option to handle this case. The first is to pass the entire dataset to each pass, one after the other, and perform the merge operation in either the host software or locally on the accelerator. Each row that qualifies either pass needs to be tagged to uniquely identify the row in the input dataset so that the merge operation can remove the duplicates from the final result. The tagged identifier can be from the input row, such as the row ID, or added by the accelerator. A second, more efficient option is to separately save the non-qualifying rows from the first pass and only feed those to the second pass. Again depending upon the amount of available memory on the accelerator and the size of the dataset, these non-qualifying rows may be held locally on the accelerator or returned to the host. The final result is a union of the two sets of qualified rows from the two passes and contains no duplicates. In exemplary embodiments, the first pass 606 and the second pass 608 can be executed on different accelerators simultaneously (if available) or sequentially on the same accelerator.

By way of further elaboration, in accordance with at least one embodiment of the invention, and with reference to at least one illustrative and non-restrictive example, a database acceleration system is implemented on a PCIe-attached FPGA card and is integrated with a commercial database system. The FPGA operates on DBMS in-memory data and writes the results back into the host CPU's main memory. Data is transferred between the FPGA and the host using direct memory access (DMA) operations. Once the DBMS sends a job request to the FPGA, all the DMA operations are initiated by the FPGA without any intervention from the host CPU.

In accordance with at least one embodiment of the invention, two distinct pieces of logic implement an associated functionality. A service layer provides all of the logic that interfaces to the PCIe, DMA engines and job management logic. On the other hand, application logic implements just the functions required to process database queries on the FPGA. A set of well-defined interfaces exist between the two that include data buses for input and output data, queues for DMA requests, and control signals.

In accordance with at least one embodiment of the invention, on a host CPU, a job queue is maintained and the device driver and service layer logic cooperate to dispatch the jobs to the FPGA. Once a job has been dispatched, the service layer passes the job structures to the application logic and signals it to begin. From then on, the service layer only processes the DMA requests and updates the status of the jobs to the host. This structure allows the application logic to be developed independent of the service layer.

In accordance with at least one embodiment of the invention, it can be appreciated that enabling FPGA acceleration for a DBMS is an end-to-end effort. One aspect is to restructure the data flow. Secondly, the capability of transforming a DBMS query into a format that the FPGA accelerator can interpret for dynamic self-customization is also critical for accelerating various workloads without the need for recompiling or reloading acceleration function on FPGA. As such, a long running predicate evaluation query can be divided into multiple jobs for an FPGA to process sequentially. Each job thus involves a number of data pages as input for the FPGA to read, and an output buffer into which the FPGA writes the results. Both data transferring actions are initiated by the FPGA. For FPGA acceleration, a list of data pages (addresses) can be obtained by a data service layer in DBMS and read by the FPGA. For output data from the FPGA, the DBMS allocated buffer is filled by the FPGA engine with its results. The data format in this output buffer conforms to the structure that is understood by DBMS processing engine for further downstream processing so additional data copy and formatting software can be avoided.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for mapping a query operation to an accelerator comprising:

receiving, by a processor, a query operation and determining a design logic of the query operation;

receiving a configuration of one or more available accelerators and an accelerator design logic of each of the one or more available accelerators;

determining if the query operation can be offloaded to one or more of the one or more available accelerators, the determining-based on determining whether the one or more available accelerators are capable of performing the query operation as indicated by the configuration and the accelerator design logic of each of the one or more available accelerators and the design logic of the query operation;

based on making a determination that the query operation can be offloaded to the one or more of the one or more available accelerators, creating software structures to interface with the one or more of the one or more available accelerators and executing the query operation on the one or more of the one or more available accelerators; and based on making a determination that the query operation cannot be offloaded to the one or more of the one or more available accelerators, determining whether the query operation can be restructured into a restructured query operation, wherein the restructured query operation is a transformation or subdivision of the query operation;

based on making a determination that the query operation can be restructured, making a determination of whether the restructured query operation can be offloaded to the one or more of the one or more available accelerators;

based on making the determination that the restructured query operation can be offloaded to the one or more of the one or more available accelerators, creating software structures to interface with the one or more of the one or more available accelerators and executing the restructured query operation on the one or more of the one or more available accelerators; and based on making the determination that the restructured query operation cannot be offloaded to the one or more of the one or more available accelerators, executing the restructured query operation in software; wherein the offloading or the executing the query operation results in an increase in processing speed.

2. The method of claim 1, further comprising:

based on making the determination that the query operation cannot be restructured, executing the query operation in software.

3. The method of claim 1, wherein the determining whether the query operation can be restructured is based on the design logic of the query operation.

4. The method of claim 1, wherein based on making the determination that the query operation can be restructured, restructuring the query operation to obtain the restructured query operation by transforming a type of the query operation.

5. The method of claim 1, wherein based on making the determination that the query operation can be restructured, restructuring the query operation by partitioning the query operation into the restructured query operation with multiple query sub-operations.

6. The method of claim 5, further comprising executing the multiple query sub-operations of the restructured query operation on different ones of the one or more available accelerators simultaneously.

7. The method of claim 5, further comprising executing the multiple query sub-operations of the restructured query operation on different ones of the one or more available accelerators sequentially.

8. A method for mapping a query operation to a hardware implementation on an accelerator comprising:

receiving, by a processor, a database query from an application, wherein the database query comprises one or more query operations;

receiving a configuration of one or more accelerators and an accelerator design logic for each of the one or more accelerators;

identifying a candidate query operation from the one or more query operations as one of the one or more query operations which can be offloaded to one of the one or more accelerators, the identifying being based on the configuration and the accelerator design logic for each of the one or more accelerators;

identifying one or more database structures holding information corresponding to the candidate query operation;

determining attributes of the one of the one or more accelerators selected to implement the candidate query operation;

creating an intermediate data structure representing the candidate query operation based on the attributes;

transforming the intermediate data structure into data structures that will be provided to the one of the one or more accelerators; wherein the transforming the intermediate data structure results in an increase in processing speed;

determining whether one or more of the one or more query operations not identified as the candidate query operation can be restructured as a restructured query operation; and based on making a determination that the one or more of the one or more query operations not identified as the candidate query operation can be restructured, determining if the one or more restructured query operations can be offloaded to any of the one or more accelerators.

9. The method of claim 8, further comprising, based on making the determination that the one or more of the one or more query operations not identified as the candidate query operation can be restructured, restructuring the one or more of the one or more query operations and identifying the one or more restructured query operations as candidate query operations.

10. The method of claim 9, wherein the restructuring the one or more of the one or more query operations comprises transforming a type of the one or more of the one or more query operations.

11. The method of claim 9, wherein the restructuring the one or more of the one or more query operations comprises partitioning the one or more of the one or more query operations into multiple query operations.

12. The method of claim 8, wherein the determining whether the one or more of the one or more query operations can be restructured is based on design logic of the one or more of the one or more query operations.

* * * * *